US 6,676,363 B1

United States Patent
Solignac

(10) Patent No.: US 6,676,363 B1
(45) Date of Patent: Jan. 13, 2004

(54) MANIPULATOR ROBOT AND INSTALLATION COMPRISING SAME

(76) Inventor: Jean-Pierre Solignac, 5, les Hauts de Pourols, F-34270 Saint Mathieu de Treviers (FR)

( * ) Notice: Subject to any disclaimer, the term of this patent is extended or adjusted under 35 U.S.C. 154(b) by 0 days.

(21) Appl. No.: 09/674,649
(22) PCT Filed: Jan. 3, 2000
(86) PCT No.: PCT/FR00/00001
§ 371 (c)(1),
(2), (4) Date: Nov. 21, 2000
(87) PCT Pub. No.: WO00/40376
PCT Pub. Date: Jul. 13, 2000

(30) Foreign Application Priority Data
Jan. 5, 1999 (FR) .......................... 99 00028

(51) Int. Cl.⁷ .................................... B25J 9/00
(52) U.S. Cl. .................................... 414/541
(58) Field of Search ............... 414/539, 744.3, 414/540, 541, 279, 281, 283, 462, 458, 498, 744.5, 744.8; 901/21, 25

(56) References Cited

U.S. PATENT DOCUMENTS

| | | | |
|---|---|---|---|
| 3,805,629 A | * 4/1974 | Martin et al. ............... | 74/89.35 |
| 4,403,907 A | * 9/1983 | Koller et al. ............ | 414/744.3 |
| 4,531,884 A | 7/1985 | Russell | |
| 4,566,847 A | * 1/1986 | Maeda et al. ............. | 414/744.3 |
| 5,178,512 A | * 1/1993 | Skrobak ................... | 414/744.5 |
| 5,480,015 A | * 1/1996 | Yang .......................... | 192/56.1 |
| 5,551,828 A | * 9/1996 | Iles .............................. | 414/757 |
| 5,667,353 A | * 9/1997 | Drake ...................... | 414/744.3 |
| 5,807,063 A | * 9/1998 | Swart ...................... | 414/744.8 |
| 6,309,303 B1 | * 10/2001 | Vodicka ...................... | 464/30 |

FOREIGN PATENT DOCUMENTS

| | | |
|---|---|---|
| DE | 23 41 133 A | 2/1975 |
| FR | 2 070 719 A | 9/1971 |

* cited by examiner

Primary Examiner—Eileen D. Lillis
Assistant Examiner—Charles A. Fox
(74) Attorney, Agent, or Firm—Harrison & Egbert

(57) ABSTRACT

A robot including a manipulating arm affixed to a hub by axial tapping so that the hub engages a threaded part of a driving shaft. The hub and driving shaft are coupled with output shaft of motor controlled by command and control unit. A braking gear linked to the hub and the driving shaft to ensure that the hub is locked with respect to the driving shaft as long as the moment of resistance exerted on the hub is less than a predetermined value. The gear enables the rotation of either the hub or shaft with respect to the other when the moment is equal to a set value. A mechanism for rotation locking, capable of being activated by the command and control unit, is further provided to lock rotation of the hub and the arm. When the mechanism for rotation locking is activated to block the hub and or the arm, then the arm is capable of being vertically translated by activating the motor.

28 Claims, 4 Drawing Sheets

MANIPULATOR ROBOT AND INSTALLATION COMPRISING SAME

BACKGROUND OF THE PRESENT INVENTION

1. Field of the Invention

The present invention relates to a conveyor robot namely for the manipulation and transport of an object along a specified path.

2. Description of Related Art

Robots are already known from the prior art for the manipulation of objects. These robots contain a manipulator arm that is mobile along three axes in space. Generally, this arm is motorized by three motor structures constructed based on a kinematic configuration called an open chain. The first of these structures ensures the displacement of the manipulation arm along a first horizontal axis, the second structure along a second horizontal axis normal to the first one, and the third along a vertical axis. The main disadvantages of these structures rest in their complexity and in their high cost.

BRIEF SUMMARY OF THE INVENTION

The purpose of the invention presented here is to compensate for the disadvantages mentioned by implementing a, manipulator robot having an excellent efficiency while having a simplified design and a low cost.

For this purpose, the manipulator robot according to the present invention contains a manipulator arm that can be moved by a first motor piloted by a command and control unit, whereby the first motor and the unit are installed in a frame mounted on the running gears. This robot is characterized essentially in that:

- the first motor is equipped with a rotary output shaft on which a mechanical torque is applied,
- the manipulator arm is affixed by one of its ends to a hub provided with an axial internal screw threading in which the threaded part of a drive shaft, which is coupled to the rotary output shaft of the first motor, is engaged by being screwed in,
- it is provided with a brake gear that is connected to the hub and to the drive shaft, this brake gear ensuring the immobilization of the hub relative to the drive shaft while the resistance torque exerted on the arm or on the hub is less than a predetermined value, and this gear allowing the rotation of the hub relative to the drive shaft while this resistance torque is equal to this value; and
- it is provided with a mechanism for locking in rotation activated by the command and control unit in order to lock the rotation of the hub and the arm, this mechanism while it is activated acting to lock on the hub and/or on the arm, the aforementioned arm being thus able to be moved in translation relative to the chassis by activation of the first motor.

Thus, this device makes it possible to avoid the use of a third motor for the displacement of the arm in translation. The first motor ensures the displacement of the arm in rotation while the brake gear is deactivated and its drive in translation when this gear is activated.

According to another characteristic of the invention:

- the axial internal threading made in the hub is extended axially by a smooth bore,
- the drive shaft, in the axial extension of its threaded part, is equipped with a smooth bearing surface engaged in the smooth bore of the hub; and
- the brake gear is made by a stopper of a synthetic material engaged in a radial hole made in the hub and opening into the axial bore of it, this stopper being held under pressure against the smooth bearing surface of the drive shaft.

The invention presented here also has the purpose of a system that is essentially characterized in that it is equipped with at least one robot according to the invention.

According to another characteristic of the invention, the system consists of at least one distribution station for solid and/or liquid material by dosed quantities as well as at least one processing station, these different stations being arranged one after the other relative to at least one track on which the robot maneuvers.

BRIEF DESCRIPTION OF THE SEVERAL VIEWS OF THE DRAWINGS

Other advantages and characteristics of the invention appear in reading the description of a preferred embodiment form, and referring to the attached drawings.

DETAILED DESCRIPTION OF THE INVENTION

Figure 1:
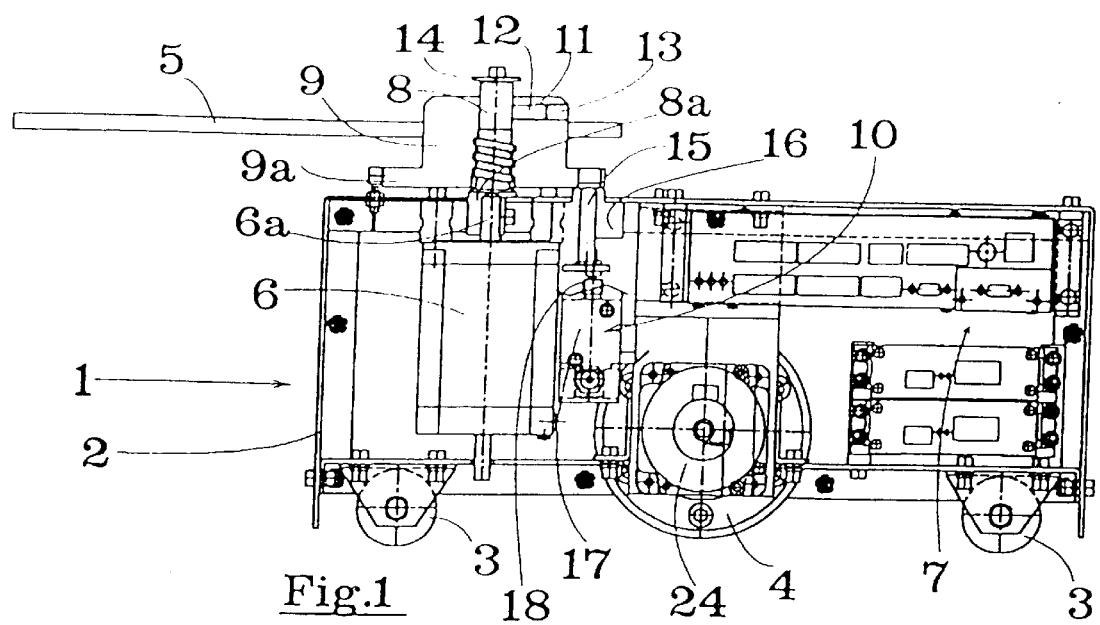
FIG. 1 is a sectional view of the profile of the robot according to the invention.

As shown, the manipulator robot 1 according to the invention consists of a chassis 2 mounted on the running gears 3, 4 in order to maneuver on a track. The chassis is made of a three-dimensional structure that defines a parallelepiped volume that receives a protection cover forming the upper horizontal wall and the lateral vertical walls in the front, rear, right and left of the robot.

The robot 1 consists of a horizontal manipulator arm 5 that can be moved in rotation in a horizontal plane by a first electric motor 6, piloted by a command and control unit 7 installed affixed to the chassis, in the space that is defined by the cover. In this space, at least one electric battery can be installed, which ensures the supply of electric power to the first electric motor, the command and control unit 7 and more generally to any of the electric components mounted on the robot. The electric supply can also be outside of the robot, in which case a known type of electric line is provided in order to electrically connect this supply to the electric components of the robot. The unit 7 commands and controls notably the movements of the arm 5.

The electric motor 6 is of the type consisting of a rotary output shaft 6a on which a driving torque is applied. The output shaft of this motor can be driven in rotation in one direction or the other according to the direction of the electric voltage applied to the supply terminals.

The supply of electric power and the direction of the voltage applied to the input terminals of the motor 6 are two parameters generated by the command and control unit 7.

The electric motor 6 is affixed by its casing to the lower side of the horizontal upper wall. This wall, in axial alignment with the output shaft of the electric motor 6, is provided with a cylindrical hole going through it, in which the tip of the coupling 8a of the vertical drive shaft 8 of the arm 5 engages. This tip of the coupling 8a is affixed by connecting to the output shaft 6a of the electric motor 6.

The drive shaft 8 consists of a threaded part and a smooth part formed in the extension of the threaded part. Onto this drive shaft 8, a hub 9 is united to make a solid piece to receive the manipulator arm 5 by being affixed to it. This hub has a cylindrical form and contains at a lower end a seating 9a having a circular contour.

The hub 9 is provided with an axial internal threading in which the threaded part of the drive shaft 8 engages by being screwed in. In the axial extension of the threading, the hub 9 consists of a smooth bore, opening into the upper side of the hub. In this smooth bore, the smooth bearing surface of the drive shaft engages.

Onto the hub 9 and the drive shaft 8, a brake gear is linked, ensuring the immobilization of one relative to the other when the resistant torque exerted on the hub 9 is less than a predetermined value, and allowing the rotation of one relative to the other when the resistant torque is equal to this value. In addition, a mechanism is provided for locking in rotation 10 activated by the command and control unit 7 in order to act on the hub 9 and to block the rotation of the hub and thus of the arm 5. This mechanism 10, when it is activated, ensures the locking of the arm 5 in rotation relative to the chassis. This arm 5 can thus be moved in translation relative to the chassis by the activation of the first motor 6. While this mechanism is deactivated and thus disengaged from the hub 9, the arm 5 can be driven in rotation by the first motor 6.

According to the preferred embodiment form, the brake gear is housed in a radial hole 11 made in the hub and opening into the axial bore of it. This brake gear is made of a cylindrical stopper 12, of a synthetic material kept at a pressure against the smooth bearing surface of the drive shaft. According to the preferred embodiment form, the stopper is kept against this smooth bearing surface by an axial thrust exerted by a screw 13 engaged by screwing into an internal threading made in the radial hole 11.

Thus, it is understandable that the transmission of the motor torque and of the rotation movement between the drive shaft and the hub is done by the intermediary of the brake gear. Also, it is understandable that this rotation movement is no longer transmitted if the resistant torque exerted on the hub reaches a certain value that is directly dependent on the forces of pressure between the stopper 12 and the smooth bearing surface of the drive shaft 8. It is thus possible to adjust this value in a precise manner as a locking torque of the screw 13. When the resistant torque reaches this value, the transmission of rotation movement to the hub no longer occurs. On the other hand, as the drive shaft is always driven in rotation by the motor 6, this produces in the rotational direction of the output shaft of the motor, a movement of unscrewing or screwing the threaded part of the shaft 8 in the internal threading of the hub 5, either towards the top (unscrewing movement), or towards the bottom (screwing movement). In this manner, the arm 5 can be elevated relative to the chassis and then lowered.

Advantageously, the synthetic material used for the stopper 12 is of the type of those marketed under the name TEFLON(™). Other materials can be used having equivalent mechanical properties. Due to the mechanical characteristics of the material used, the stopper 12 ensures effective braking of the screw 13 so much so that the intensity of the forces of pressure of the stopper against the smooth bearing surface of the shaft remains constant over time or at least varies very little.

The linear course of the arm is controlled by the control and command unit 7 that controls, for this purpose, the number of turns made by the output shaft of the motor 6 due to the information supplied by an incremental counter coupled to this shaft. However, in order to compensate for any risks of malfunction of the control and command unit 7, the drive shaft 8, outside of the hub, at the free end, consists of an abutment 14 forming a shoulder. At the lower position of the arm 5 and thus of the hub 9, the upper side of this hub 9 is offset from the abutment. This abutment is thus fitted to limit the linear course of the arm 5 and most particularly its ascending movement.

According to the preferred embodiment form, the mechanism 10 for locking in rotation is made of a locking pin 15, preferably vertical, mounted in a manner so that it is mobile in translation in a guide bearing 16 united to make a solid piece with the chassis, and by a motor instrument 17 for activating the pin 15, controlled by the control and command unit 7. More specifically, the guide bearing 16 is affixed in an opening made in the upper wall of the cover. The motor instrument 17 is equipped with an output shaft 18 for linear displacement which is united to, make a solid piece with the locking pin 15. This locking pin, when the motor instrument 17 is activated, comes to engage a hole 22 made in the hub 9 in order to form a connection by being an obstacle and to block rotation. More precisely, the hole 22 is made in the seating 9a of the hub 9.

The hole 22 forms the only angular position of the arm in which it can be moved in translation. It can prove to be useful to be able to move the arm in translation while it occupies another angular position. For this reason, the hub 9 can be provided with several holes 22 whose displacement is selected as a function of the requirements.

Advantageously, the motor instrument 17 is made of a solenoid.

In order to locate the position of the locking pin 15, two capacitive sensors are provided (not shown) positioned respectively relative to the end positions of the pin 15 along its course and connected electrically to the command and control unit. These sensors are fitted to transmit information representing the lowered or elevated position of the locking pin 15 and thus information relative to the locking in rotation of the hub 9 or the release of it.

In order to simplify the assembly of the solenoid 17 as well as the pin 15 while avoiding any specific positioning of one relative to the other, the output shaft 18 of the solenoid 17 and the locking pin 15 are united relative to each other by a semi-rigid connection. According to the preferred embodiment form, the shaft 18 and the locking pin 15 are axially shifted forward one relative to the other and the semi-rigid connection is made on the one hand, in the form of a fork formed in a disc 19 affixed in the lower part of the locking pin 15 and of a circular groove 20 hollowed in a cylindrical joining piece 21 affixed to the output shaft 18. The shape of the fork is engaged with low play in the groove 20. Such a device is favorable for avoiding any jamming.

The hub 9 is equipped with at least one initialization reference mark 23 facing the trajectory of which a detector is arranged that is electrically connected to a command and control unit, this detector supplying a signal for detection of the reference mark 23, this signal being used by the control and command unit 7 in order to mark the original angular position of the arm. According to the preferred embodiment form, the initialization reference mark 23 is made of a excessive thickness peripheral to the hub, limited by two diametrically opposed radial end sides. This excessive thickness is affixed by a screw to the seating 9a of the hub 9.

According to the preferred embodiment form, the detector is of the photoelectric type. Preferably, the detector is installed in the space that is defined by the structure of the chassis. In order to detect the passage of the reference mark 23, an optical fiber is then used, which is engaged at one of its ends in a hole that is made going through in the upper wall facing the path of the reference mark 23 and positioned by its other end relative to the photoelectric cell of the detector.

Advantageously, mechanisms are provided for detection of the locking of the arm in rotation, which are activated when the mechanism for locking in rotation is deactivated. These mechanisms are essentially made of the incremental coder coupled to the motor 6 and by the control and command unit 7, which compares at each instant the real angular position of the arm to the theoretical position of it, this position being defined in a manner by software programming. In the case where the distance between the two positions is greater than a prespecified value, the command and control unit 7 deactivates the motor 6.

One of the running gears is coupled to a second motor 24 controlled by the command and control unit 7. According to the preferred embodiment form, three running gears are provided, of which the first and the second 3 are placed on one side of the chassis and the third 4 on the other. The third running gear is coupled to the output shaft of the second motor instrument 24.

An incremental coder is coupled to the output shaft of the second motor instrument 24. This incremental coder is connected electrically to the control and command unit 7 and transmits information regarding the absolute position of the robot. As for the arm, the central unit continuously compares the real position of the robot to the theoretical position and cuts the supply to the motor if the distance of the position is greater than a predetermined value.

According to a first embodiment form, the third running gear 4 is made of a catch gear and is designed to act together with a rack 25 made on a track 26 on which the robot is designed to maneuver. This track can be in a straight line or curved or it can even follow any type of profile desired.

The two first running gears 3 can be made up of rollers for a triangular groove and can be designed to be engaged on a guide rail 27 having a triangular cross-section formed on the track 26.

According to a second embodiment form, the running tread of the third running gear is smooth.

According to a particularly advantageous form of the invention, the second motor instrument 24 is united to make a solid piece with a plate mounted in rotation along a vertical axis, the plate along this axis being coupled to the vertical output shaft of a third motor instrument controlled and commanded by the command and control unit. This device controls the direction of the third running gear. Thus, in activating the second and third motor instruments, it is possible to command and control the maneuvering of the robot, not only on the guide rails which determine an immovable route, but also on a horizontal plane, along any variable route, controlled and commanded by Hertzian waves or ultrasonic waves. For this purpose the robot will be equipped with a receptor for Hertzian waves or a receptor for ultrasonic waves connected electrically to the command and control unit 7 and provided with a station for telecommunications arranged at a distance, this station being provided with a transmitter of Hertzian waves or a transmitter of ultrasonic waves designed to be controlled by an administrator and/or a computer, the latter ensuring the guidance of the robot by telecommunications in the space which it must maneuver, this space can be a place consisting of one or more levels where the topography and the placement of furniture and other objects that equip it are known and stored in the memory register. The telecommunications station will be equipped with a screen by which the administrator can see the map of the place and see the position of the robot in the place for the purpose of piloting it. In order to ensure the locating of its position, the robot will be equipped with a system for echo-location connected electrically to the command and control unit 7 and with a transmitter for Hertzian waves and ultrasonic waves in order to indicate its position to the station, this transmitter being also connected electronically to the command and control unit 7. In addition, the telecommunications station will be equipped with a receptor for Hertzian waves and ultrasonic waves in order to receive the position of the robot. This robot will be equipped with detectors for obstacles judiciously arranged in periphery, consisting, for example, of ultrasonic detectors by radar, etc. These detectors are connected electrically to the command and control unit 7.

As soon as the robot encounters an object on its route, the command and control unit 7 commands the stop of the second motor 24 and activates the system for echo-localization and transmits to the telecommunications station a message that is representative of the stop of the robot and its position. The administrator and/or the computer can then define another route.

It is noted that the transmission mode is not limited to the transmission by Hertzian waves or ultrasonic waves, any other type of waves can be used, for example, infrared waves.

Figure 2:
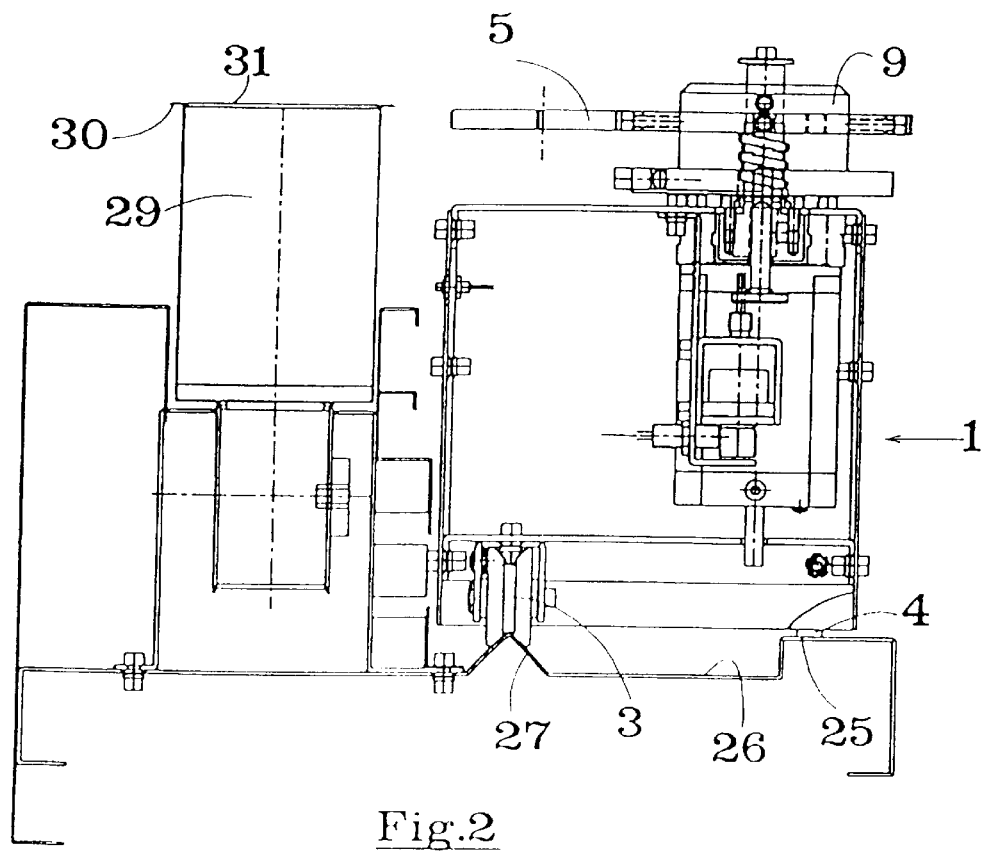
FIG. 2 is a sectional view of the side of the robot associated with a system according to the invention.
Figure 3:
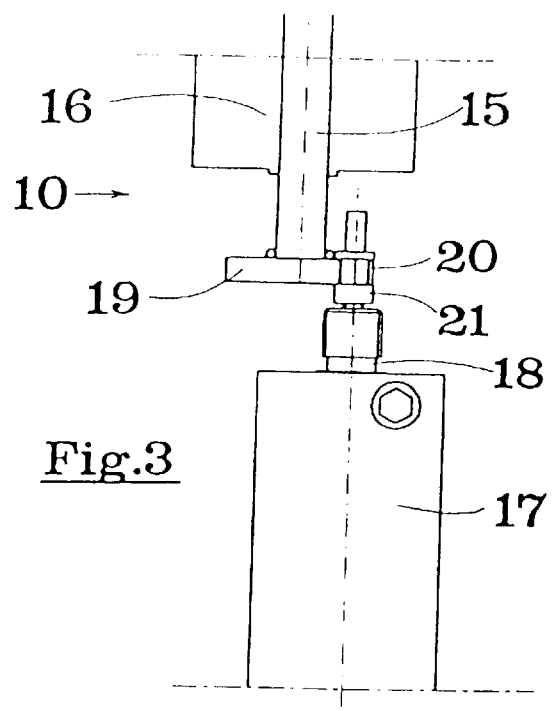
FIG. 3 is a detailed schematic view of the robot according to the invention.
Figure 4:
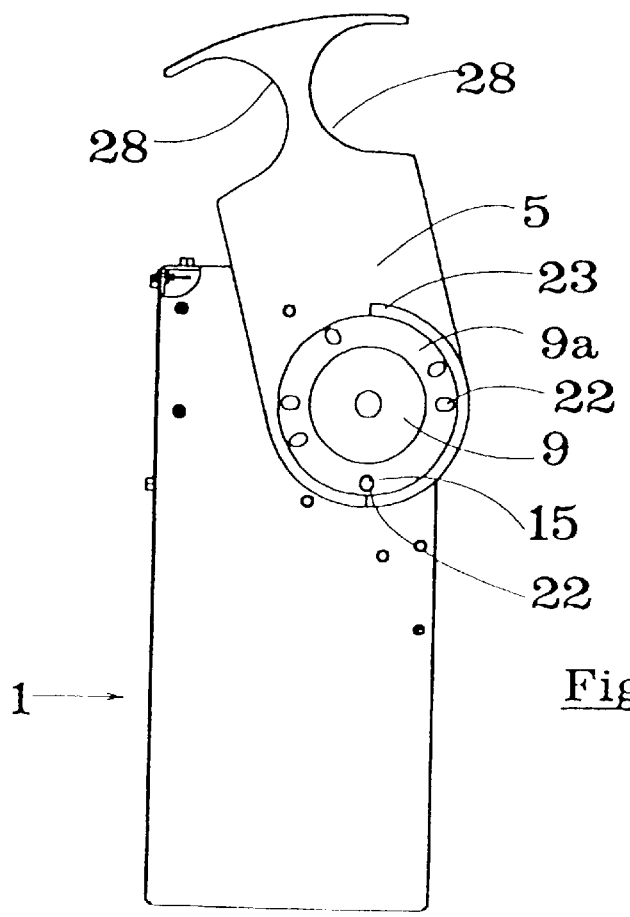
FIG. 4 is a top view of the robot according to the invention.
Figure 5:
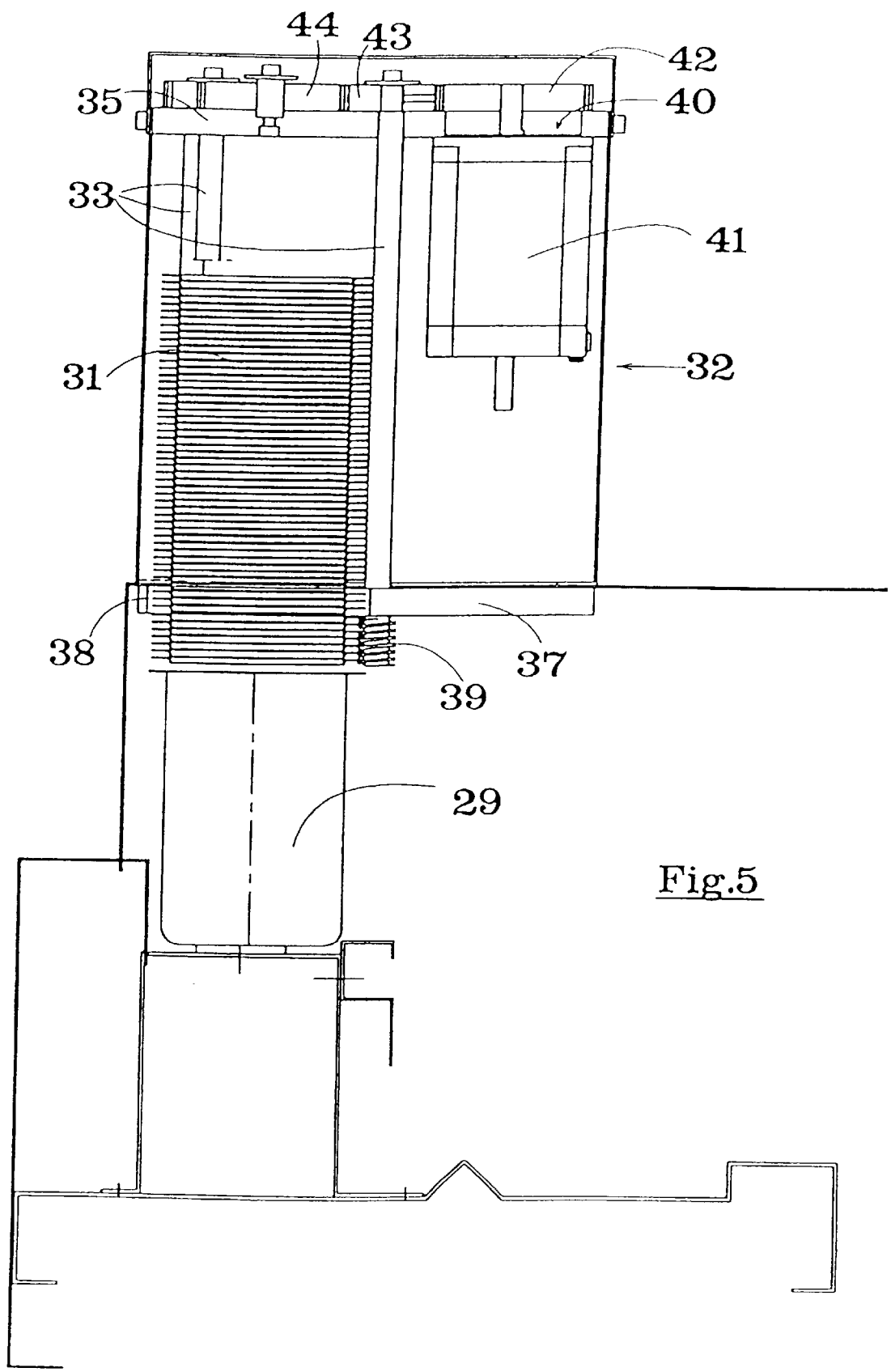
FIG. 5 is a longitudinal sectional view of the cover distributor according to the invention.
Figure 6:
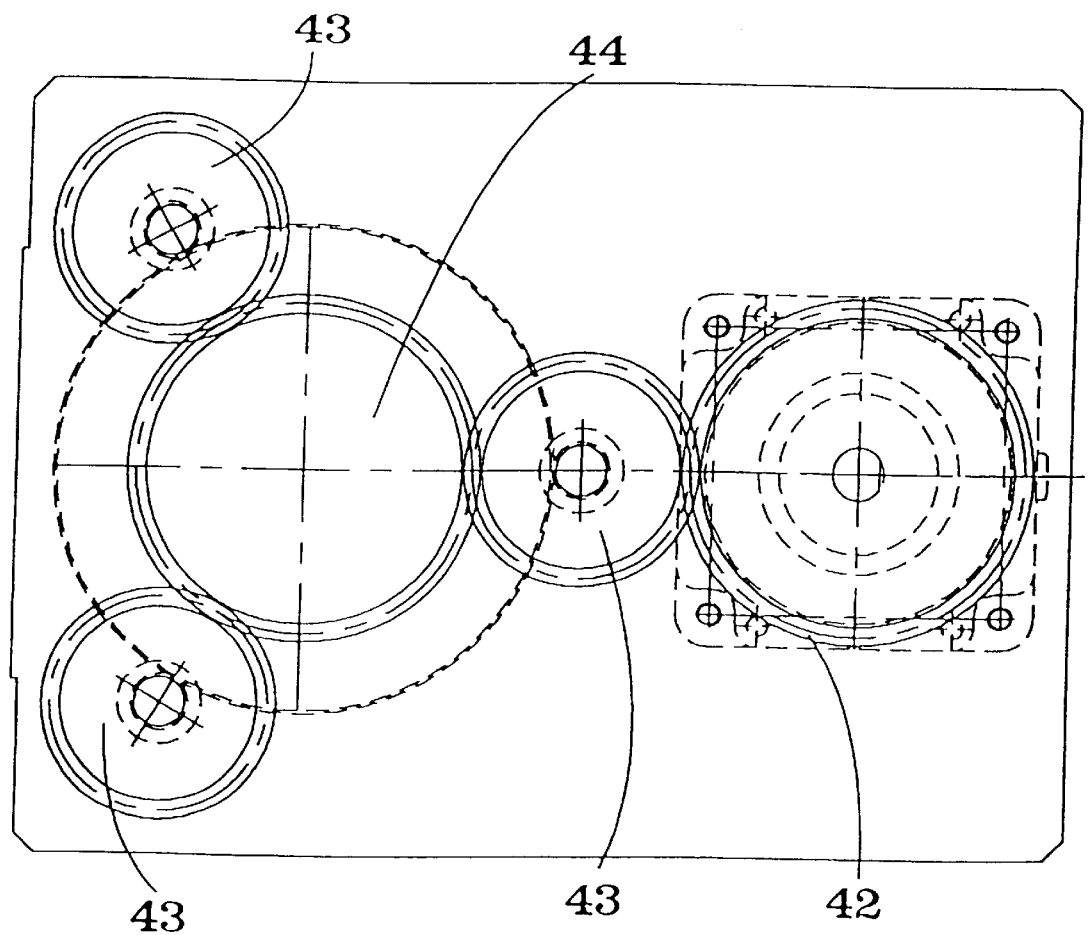
FIG. 6 is a top view of the cover distributor according to the invention.

The arm 5 at the free end can be equipped with a prehensile squeezing device, a tool, a read and/or write head, a fork lift, a measuring instrument, a cleaning tool or even as can be seen in FIG. 2, with two opposed indentations 28 by the border of each of which it is designed to engage under the prehensile flange of an object to be grasped and transported.

The robot as described is designed to equip a system for distribution of solid and/or liquid and/or pasteous materials, this system possibly carrying out the treatment of these materials. For this purpose, the system consists of at least one station for the distribution of solid and/or liquid and/or pasteous materials according to dosed quantities and possibly one or more station(s) for treatment. These different stations are arranged one after the other along the track 26 that consists, as previously mentioned, of on the one hand, the rack 25 and the other hand, the guide rail 27. The rack and the guide rail are parallel to each other, and the running gears 3, 4 of the robot are designed to act together with the rack and the guide rail.

The materials sent by the different stations of the system are collected in the cylindrical containers 29 each containing a prehensile flange 30 along the lip. Each container is transported from station to station by the manipulator robot and after mixing the different ingredients according to a preset program, first, if need be, towards an agitator station then towards an evacuation station.

In order to prevent the evaporation of liquid products, or more generally the volatile ingredients of distributed materials, each container 29 is able to receive a cover 31.

Thus, the system is fitted with a distributor 32 of covers 31. This distributor consists of a chassis supporting a cover magazine in which the covers are stacked in a pile. In addition, this distributor 32 consists of a take-off and distribution mechanism for taking off the lower cover of the stack and distributing it to the container 29 positioned previously under the pile by the robot.

Each cover 29 contains a truncated-cone shaped stopper made by a swaging bordered by a prehensile flange, the covers in the magazine being stacked one into the other by their stopper shape. The flanges of the covers, in the pile that is formed, are spaced regularly from each other.

The mechanism for taking off the cover is made of at least three vertical shafts 33 spaced apart from each other and defining a volume for stacking in which the cover pile 29 is formed. The shafts 33 are mounted rotatably with the upper bearings united to make a solid piece with an upper horizontal plate 35 and in the lower bearings affixed to a lower horizontal plate 37. This plate 37 is provided with a circular hole 38 going through the covers. Each shaft 33, below the lower plate 37, is provided with a threaded joining piece 39 in the thread of which, the prehensile flange of the cover 29 is engaged, the shafts being driven simultaneously in rotation by a motor assembly 40 in the direction of the distribution of the cover.

The pitch of the thread of each threaded joining piece 39 is equal to or is a multiple of the interval between two consecutive flanges.

The motor assembly 40 is made of an electric motor 41 affixed by its housing to the upper plate 35 that contains on the output shaft a drive pinion 42 acting together enmeshed with a second pinion 43 affixed on one of the shafts, this second pinion being enmeshed with a toothed transmission gear 44, with which two other pinions 43 are acting together respectively affixed on the two other shafts 33.

The different motors of the robot and the motor 41 of the distributor of the covers are advantageously of the same type which allows a sensible reduction in the cost of the assembly.

In addition, these motors are supplied with electric power based on a voltage that is well below their normal voltage of use which allows them to increase both the reliability and the safety of the assembly.

Needless to say, the invention presented here can have any arrangements and variations in the domain of equivalent techniques without leaving the score of the present patent.

I claim:

1. A system comprising a motorized manipulator robot, said manipulator robot having a manipulator arm movable by a first motor piloted by a command and control unit, whereby the first motor and the unit are installed in a frame mounted on running gears, wherein:

the first motor has a rotary output shaft on which a mechanical torque is applicable, the manipulator arm is affixed by one end to a hub provided with an axial internal screw threading in which a threaded part of a drive shaft is engaged by being screwed in, said drive shaft being coupled to the rotary output shaft of the first motor, the system further comprising a brake gear that is connected to the hub and to the drive shaft, said brake gear immobilizing the hub relative to the drive shaft when a resistance torque exerted on the hub is less than a predetermined value, said brake gear allowing the rotation of one of said hub and said drive shaft relative to the other of said hub and said drive shaft when the resistance torque is equal to the predetermined value; and a means for locking activatable by the command and control unit for locking the rotation of the hub and the manipulator arm, said means for locking locked onto the hub or the arm for enabling said manipulator arm to be moved in translation relative to the frame by activation of the first motor.

2. The system according to claim 1, wherein an axial internal threading is formed in the hub and extended axially by a smooth bore, wherein said drive shaft has a smooth bearing surface axially extended from said threaded part thereof, said bearing surface engaged in the smooth bore of the hub, wherein said brake gear has a stopper of a synthetic material engaged in a radial hole formed in the hub and opening into an axial bore, said stopper being held under pressure against the smooth bearing surface of the drive shaft.

3. The system according to claim 2, wherein said stopper is kept against the drive shaft by an axial thrust exerted by a screw engaged by screwing into an internal threading formed the radial hole.

4. The system according to claim 1, wherein said drive shaft has a free end outside of said hub, said drive shaft has an abutment forming a shoulder in order to limit a linear course of the arm.

5. The system according to claim 1, wherein said means for locking comprises a locking pin mounted mobile in translation in a guide bearing, said guide bearing united to make a solid piece with the frame, said means for locking further comprising a motor instrument for activating the locking pin, said motor instrument controlled by the control and command unit, said motor instrument having an output shaft for linear displacement which is united to make a solid piece with the locking pin, said locking pin engages in a hole formed in the hub ehn the motor instrument is activated.

6. The system according to claim 5, wherein said output shaft for linear displacement and the locking pin are united with each other by a semi-rigid connection.

7. The system according to claim 6, wherein said shaft for linear displacement and the locking pin are axially shifted forward relative to each other and the semi-rigid connection is in the form of a fork formed in a disc affixed in a lower part of a locking pin or in the form of a circular groove hollowed in a cylindrical joining piece affixed to the output shaft of the motor instrument, the fork being engaged in the circular groove of the cylindrical joining piece.

8. The system according to claim 1, further comprising a means for detecting the locking of the manipulator arm in rotation, said means for detecting being activated when the means for locking is deactivated.

9. The system according to claim 1, wherein one of the running gears is coupled to a second motor, said second motor being controlled by the command and control unit.

10. The system according to claim 9, said running gears comprising three running gears, a first and a second running gear of said three running gears are placed on one side of the frame and a third running gear of said three running gears is placed on another side of the frame.

11. The system according to claim 10, wherein said third running gear is coupled to the output shaft of the second motor.

12. The system according to claim 9, further comprising an incremental coder coupled to an output shaft of the second motor.

13. The system according to claim 10, wherein said third running gear is comprised of a catch gear and meshes with a rack formed on a track on which the manipulator robot maneuvers.

14. The system according to claim 13, wherein said first and second running gears are comprised of rollers with a triangular groove and engaged on a guide rail having a triangular cross-section formed on the track.

15. The system according to claim 9, wherein said second motor makes a solid piece with a plate mounted in rotation along a vertical axis, the plate being coupled to a vertical output shaft of a third motor.

16. The system according to claim 1, wherein said hub further comprises at least one initialization reference mark facing a trajectory of which a detector means is arranged that is electrically connected to said command and control unit, said detector means for supplying a signal for detection of the reference mark, the signal being received by the control and command unit in order to mark an original angular position of the manipulator arm.

17. The system according to claim 16, wherein the initialization reference mark is comprised of an excessive thickness peripheral to the hub limited by two radial end sides.

18. The system according to claim 1, wherein said manipulator arm has two opposed indentations at a free end thereof engagable under a prehensile flange of an object to be grasped and transported.

19. The system according to claim 1, further comprising a receptor for sound waves connected electrically to the command and control unit in order to receive telecommunication signals from a telecommunication station arranged at a distance, the station having a transmitter of the sound waves for guiding the manipulator robot by telecommunication.

20. The system according to claim 19, further comprising a system for echo-localization connected electrically to the command and control unit and with a transmitter means for indicating a position thereof to the telecommunication station, said transmitter means connected electronically to the command and control unit.

21. The system according to claim 1, further comprising a plurality of distribution stations, said plurality of distribution stations having dosed quantities of at least one of said material and liquid material and pasteous material, said plurality of stations being arranged one after the other relative to at least one track on which the manipulator robot maneuvers.

22. The system according to claim 21, wherein said track further comprises a rack and a guide rail, the rack and the guide rail being parallel to each other, the running gears of the manipulator robot cooperative with the rack and the guide rail.

23. The system according to claim 21, further comprising a distributor of covers having a chassis supporting a cover magazine in which the covers are stacked in a pile, said distributor having a take-off and distribution means for taking off a lower cover of the pile and for distributing the lower cover to the container positioned previously under the pile by the manipulator robot.

24. The system according to claim 23, wherein each of said covers comprises a truncated-cone shaped stopper made by a swaging bordered by a prehensile flange, the covers in the magazine being stacked one into the other.

25. The system according to claim 24, wherein said flanges of the covers in the pile are spaced regularly from each other.

26. The system according to claim 23, wherein said means for taking off the covers is comprised of at least three vertical shafts spaced apart from each other and defining a volume for stacking in which the pile of covers is formed, the vertical shafts being mounted in rotation in upper bearings united to make a solid piece with an upper horizontal plate and in lower bearings affixed to a lower horizontal plate, whereby said lower horizontal plate has a circular hole going through the covers, each of the vertical shafts below the lower plate has a threaded joining piece, the prehensile flange of the cover being engaged in a thread of the threaded joining piece, the vertical shafts being driven simultaneously in rotation by a motor assembly in a direction of the distribution of the cover.

27. The system according to claim 26, wherein a pitch of the thread of each threaded joining piece is equal to or is a multiple of an interval between two consecutive flanges of the covers.

28. The system according to claim 26, wherein said motor means is comprised of an electric motor affixed by a housing thereof to the upper plate that contains a drive pinion on an output shaft thereof cooperative with a second pinion affixed on one of the vertical shafts, said second pinion being enmeshed with a toothed transmission gear with which two other pinions cooperative are acting together and respectively affixed on the other vertical shafts.

* * * * *